United States Patent
Enzmann et al.

(10) Patent No.: US 7,636,575 B2
(45) Date of Patent: *Dec. 22, 2009

(54) THIRD PARTY LOCATION QUERY FOR WIRELESS NETWORKS

(75) Inventors: Mark J. Enzmann, Roswell, GA (US); Robert T. Moton, Jr., Alpharetta, GA (US); Samuel N. Zellner, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/589,688

(22) Filed: Oct. 30, 2006

(65) Prior Publication Data

US 2007/0105565 A1     May 10, 2007

Related U.S. Application Data

(63) Continuation of application No. 09/739,315, filed on Dec. 19, 2000, now Pat. No. 7,130,630.

(51) Int. Cl.
    *H04W 24/00*    (2009.01)
(52) U.S. Cl. .............. 455/456.5; 455/456.1; 455/404.2; 455/435.1
(58) Field of Classification Search .............. 455/435.1, 455/404, 456.1
    See application file for complete search history.

(56) References Cited

U.S. PATENT DOCUMENTS

| | | |
|---|---|---|
| 4,445,118 A | 4/1984 | Taylor et al. |
| 4,757,267 A | 7/1988 | Riskin |
| 5,303,393 A | 4/1994 | Noreen et al. |
| 5,444,444 A | 8/1995 | Ross .......................... 340/994 |
| 5,511,111 A | 4/1996 | Serbetcioglu et al. |

(Continued)

FOREIGN PATENT DOCUMENTS

EP     000964542 A2    12/1999

(Continued)

OTHER PUBLICATIONS

U.S. non-final Official Action dated Oct. 5, 2006 in U.S. Appl. No. 11/298,149.

(Continued)

*Primary Examiner*—Jean A Gelin
(74) *Attorney, Agent, or Firm*—Parks IP Law LLC; Adam J. Citrin, Esq.

(57) ABSTRACT

A location query service for use with a wireless network that tracks the location of network devices, such as a network complying with enhanced 911 standards. The service provides requestors with the locations of network users, based on the locations of the users' wireless network devices. The service receives a location query from a requester, retrieves location information associated with the network user, and returns the location information to the requester. Alternately, before returning the location information to the requestor, the service authenticates that the requestor is authorized by the network user to receive the network user's location information. A requestor can submit a location query, for example, by voice calls through the Public Switched Telephone Network (PSTN) to an interactive voice response unit (IVRU), personal computer access through a global computer network, and cellular telephone access through a global computer network.

11 Claims, 4 Drawing Sheets

U.S. PATENT DOCUMENTS

| | | | |
|---|---|---|---|
| 5,512,908 | A | 4/1996 | Herrick |
| 5,528,248 | A | 6/1996 | Steiner et al. |
| 5,566,235 | A | 10/1996 | Hetz |
| 5,588,042 | A | 12/1996 | Comer |
| 5,596,625 | A | 1/1997 | LeBlanc |
| 5,610,973 | A | 3/1997 | Comer |
| 5,625,364 | A | 4/1997 | Herrick et al. |
| 5,657,375 | A | 8/1997 | Connolly et al. |
| 5,663,734 | A | 9/1997 | Krasner |
| 5,694,453 | A | 12/1997 | Fuller et al. |
| 5,701,301 | A | 12/1997 | Weisser, Jr. |
| 5,712,899 | A | 1/1998 | Pace, II |
| 5,727,057 | A | 3/1998 | Emery et al. |
| 5,771,283 | A | 6/1998 | Chang et al. |
| 5,794,210 | A | 8/1998 | Goldhaber et al. |
| 5,819,155 | A | 10/1998 | Worthy et al. |
| 5,838,774 | A | 11/1998 | Weisser, Jr. |
| 5,852,775 | A | 12/1998 | Hidary |
| 5,875,401 | A | 2/1999 | Rochkind |
| 5,903,636 | A | 5/1999 | Malik |
| 5,949,867 | A | 9/1999 | Sonnenberg |
| 5,961,593 | A | 10/1999 | Gabber et al. |
| 5,963,866 | A * | 10/1999 | Palamara et al. ......... 455/456.5 |
| 6,011,975 | A | 1/2000 | Emery et al. |
| 6,028,921 | A | 2/2000 | Malik et al. |
| 6,047,327 | A | 4/2000 | Tso et al. |
| 6,085,086 | A | 7/2000 | La Porta et al. |
| 6,091,956 | A | 7/2000 | Hollenberg |
| 6,101,381 | A | 8/2000 | Tajima et al. |
| 6,112,186 | A | 8/2000 | Bergh et al. |
| 6,122,520 | A | 9/2000 | Want et al. |
| 6,133,853 | A | 10/2000 | Obradovich et al. |
| 6,138,003 | A | 10/2000 | Kingdon et al. |
| 6,157,829 | A | 12/2000 | Grube et al. |
| 6,184,829 | B1 | 2/2001 | Stilp |
| 6,185,426 | B1 | 2/2001 | Alperovich et al. |
| 6,208,854 | B1 | 3/2001 | Roberts et al. |
| 6,208,866 | B1 | 3/2001 | Rouhollahzadeh et al. |
| 6,229,477 | B1 | 5/2001 | Chang et al. |
| 6,233,329 | B1 | 5/2001 | Urban et al. |
| 6,259,405 | B1 | 7/2001 | Stewart et al. |
| 6,311,069 | B1 | 10/2001 | Havinis et al. |
| 6,317,718 | B1 | 11/2001 | Fano |
| 6,321,092 | B1 | 11/2001 | Fitch et al. |
| 6,324,396 | B1 | 11/2001 | Vasa et al. |
| 6,332,127 | B1 | 12/2001 | Bandera et al. |
| 6,353,664 | B1 | 3/2002 | Cannon et al. |
| 6,377,810 | B1 | 4/2002 | Geiger et al. |
| 6,385,591 | B1 | 5/2002 | Mankoff |
| 6,414,635 | B1 | 7/2002 | Stewart et al. |
| 6,418,308 | B1 | 7/2002 | Heinonen et al. |
| 6,421,441 | B1 | 7/2002 | Dzuban |
| 6,427,073 | B1 | 7/2002 | Kortesalmi et al. |
| 6,442,391 | B1 | 8/2002 | Johansson et al. |
| 6,442,687 | B1 | 8/2002 | Savage |
| 6,449,497 | B1 | 9/2002 | Kirbas et al. |
| 6,463,533 | B1 | 10/2002 | Calamera et al. |
| 6,470,378 | B1 | 10/2002 | Tracton et al. |
| 6,470,447 | B1 | 10/2002 | Lambert et al. |
| 6,473,626 | B1 | 10/2002 | Nevoux et al. |
| 6,477,382 | B1 | 11/2002 | Mansfield et al. |
| 6,484,148 | B1 | 11/2002 | Boyd |
| 6,496,931 | B1 | 12/2002 | Rajchel et al. |
| 6,505,046 | B1 | 1/2003 | Baker |
| 6,505,048 | B1 | 1/2003 | Moles et al. |
| 6,505,049 | B1 | 1/2003 | Dorenbosch |
| 6,505,163 | B1 | 1/2003 | Zhang et al. |
| 6,522,876 | B1 | 2/2003 | Weiland et al. |
| 6,526,275 | B1 | 2/2003 | Calvert |
| 6,545,596 | B1 | 4/2003 | Moon |
| 6,546,257 | B1 | 4/2003 | Stewart |
| 6,560,442 | B1 | 5/2003 | Yost et al. |
| 6,560,461 | B1 | 5/2003 | Fomukong et al. |
| 6,594,482 | B1 | 7/2003 | Findikli et al. |
| 6,618,474 | B1 | 9/2003 | Reese |
| 6,618,593 | B1 | 9/2003 | Drutman et al. |
| 6,622,016 | B1 | 9/2003 | Sladek et al. |
| 6,628,928 | B1 | 9/2003 | Crosby et al. |
| 6,628,938 | B1 | 9/2003 | Rachabathuni et al. |
| 6,640,184 | B1 | 10/2003 | Rabe |
| 6,647,257 | B2 | 11/2003 | Owensby |
| 6,647,269 | B2 | 11/2003 | Hendrey et al. |
| 6,650,901 | B1 | 11/2003 | Schuster et al. |
| 6,662,014 | B1 * | 12/2003 | Walsh ...................... 455/456.2 |
| 6,675,017 | B1 | 1/2004 | Zellner et al. |
| 6,677,894 | B2 | 1/2004 | Sheynblat et al. |
| 6,701,160 | B1 * | 3/2004 | Pinder et al. ............. 455/550.1 |
| 6,716,101 | B1 * | 4/2004 | Meadows et al. ......... 455/456.1 |
| 6,732,101 | B1 | 5/2004 | Cook ........................... 707/10 |
| 6,738,808 | B1 | 5/2004 | Zellner et al. |
| 6,754,504 | B1 | 6/2004 | Reed |
| 6,799,049 | B1 | 9/2004 | Zellner et al. |
| 6,819,929 | B2 | 11/2004 | Antonucci et al. |
| 6,829,475 | B1 | 12/2004 | Lee et al. |
| 6,850,758 | B1 | 2/2005 | Paul et al. |
| 6,867,733 | B2 | 3/2005 | Sandhu et al. |
| 6,868,074 | B1 | 3/2005 | Hanson |
| 6,874,011 | B1 | 3/2005 | Spielman .................... 709/206 |
| 6,876,858 | B1 | 4/2005 | Duvall et al. |
| 6,937,869 | B1 | 8/2005 | Rayburn |
| 6,954,147 | B1 | 10/2005 | Cromer et al. |
| 7,005,985 | B1 | 2/2006 | Steeves ..................... 340/572.1 |
| 7,023,995 | B2 | 4/2006 | Olsson |
| 7,069,319 | B2 | 6/2006 | Zellner et al. |
| 7,085,555 | B2 | 8/2006 | Zellner et al. |
| 7,103,368 | B2 | 9/2006 | Teshima ................... 455/456.3 |
| 7,106,843 | B1 * | 9/2006 | Gainsboro et al. .......... 379/191 |
| 7,110,749 | B2 * | 9/2006 | Zellner et al. ............. 455/414.1 |
| 7,116,977 | B1 | 10/2006 | Moton et al. |
| 7,181,225 | B1 * | 2/2007 | Moton et al. ............. 455/456.1 |
| 7,190,960 | B2 * | 3/2007 | Wilson et al. ............. 455/456.1 |
| 7,203,502 | B2 * | 4/2007 | Wilson et al. ............. 455/456.2 |
| 7,212,829 | B1 * | 5/2007 | Lau et al. .................. 455/456.1 |
| 7,236,799 | B2 * | 6/2007 | Wilson et al. ............. 455/456.3 |
| 7,260,378 | B2 * | 8/2007 | Holland et al. ............ 455/404.2 |
| 2001/0034709 | A1 | 10/2001 | Stoifo et al. |
| 2002/0052781 | A1 | 5/2002 | Aufricht et al. |
| 2002/0077083 | A1 | 6/2002 | Zellner et al. |
| 2002/0077084 | A1 | 6/2002 | Zellner et al. |
| 2002/0077118 | A1 | 6/2002 | Zellner et al. |
| 2002/0077130 | A1 | 6/2002 | Owensby |
| 2002/0077897 | A1 | 6/2002 | Zellner et al. |
| 2002/0102993 | A1 | 8/2002 | Hendrey et al. |
| 2002/0107027 | A1 | 8/2002 | O'Neil |
| 2004/0203903 | A1 * | 10/2004 | Wilson et al. ............. 455/456.1 |
| 2004/0205198 | A1 | 10/2004 | Zellner et al. |
| 2005/0272445 | A1 | 12/2005 | Zellner |
| 2006/0030339 | A1 * | 2/2006 | Zhovnirovsky et al. .. 455/456.6 |
| 2006/0094447 | A1 | 5/2006 | Zellner |
| 2006/0105784 | A1 | 5/2006 | Zellner et al. |
| 2006/0167986 | A1 * | 7/2006 | Trzyna et al. ............... 709/203 |
| 2007/0042789 | A1 | 2/2007 | Moton et al. ............. 455/456.1 |
| 2007/0124721 | A1 * | 5/2007 | Cowing et al. ............. 717/100 |

FOREIGN PATENT DOCUMENTS

| | | |
|---|---|---|
| WO | WO 98/19484 | 5/1998 |
| WO | WO 99/27716 | 6/1999 |

OTHER PUBLICATIONS

U.S. Appl. No. 11/528,782, entitled "System and Method for Using Location Information to Execute an Action," filed Sep. 28, 2006, Inventors: Robert T. Moton, Jr. et al.

U.S. Appl. No. 11/516,164, entitled "System and Method for Using Location Information to Execute an Action," filed Sep. 6, 2006, Inventors: Samuel N. Zellner; Mark J. Enzmann; and Robert T. Moton Jr.

U.S. Appl. No. 11/522,239, entitled "System and Method for Using Location Information to Execute an Action," filed Sep. 15, 2006, Inventors: Samuel N. Zellner.

U.S. Appl. No. 11/375,849, entitled "Anonymous Location Service for Wireless Networks," filed Mar. 15, 2006, Inventors: Samuel N. Zellner; Mark J. Enzmann, Robert T. Moton, Jr.

U.S. Appl. No. 11/187,347, entitled "Location-Based Security Rules," filed Jul. 21, 2005, Inventors: Samuel N. Zellner.

U.S. Appl. No. 11/406,881, entitled "Location Blocking Service From a Wireless Service Provider," filed Apr. 19, 2006, Inventors: Samuel N. Zellner; Mark J. Enzmann, Robert T. Moton, Jr.

U.S. Appl. No. 09/740,375, entitled "Identity Blocking Service From a Web Advertiser," filed Dec. 19, 2000, Inventors: Samuel N. Zellner; Mark J. Enzmann, Robert T. Moton, Jr.

U.S. Appl. No. 11/322,531, entitled "Location Blocking Service From a Web Advertiser," filed Dec. 30, 2005, Inventors: Samuel N. Zellner; Mark J. Enzmann, Robert T. Moton, Jr.

U.S. non-final Official Action dated Apr. 22, 2005 in U.S. Appl. No. 09/739,340.

U.S. final Official Action dated Apr. 8, 2005 in U.S. Appl. No. 09/739,162.

U.S. non-final Official Action dated Sep. 6, 2006 cited in U.S. Appl. No. 09/630,134.

U.S. final Official Action dated Jul. 26, 2005 cited in U.S. Appl. No. 09/740,414.

U.S. non-final Official Action dated Dec. 19, 2005 cited in U.S. Appl. No. 09/740,375.

U.S. non-final Official Action dated Feb. 6, 2006 cited in U.S. Appl. No. 09/740,375.

U.S. final Official Action dated May 19, 2006 cited in U.S. Appl. No. 09/740,375.

BellSouth "The Real Yellow Pages", Greater Atlanta A-L, 2004 BellSouth Advertising & Publishing Corp.

BellSouth "The Real Yellow Pages", Greater Atlanta M-Z, 2004 BellSouth Advertising & Publishing Corp.

U.S. Official Action dated Apr. 21, 2006 cited in U.S. Appl. No. 11/322,531.

U.S. Official Action dated Feb. 24, 2006 cited in U.S. Appl. No. 09/630,134.

U.S. Official Action dated Mar. 10, 2006 cited in U.S. Appl. No. 11/252,039.

U.S. Appl. No. 11/298,419, entitled "System and Method for Using Location Information to Execute an Action" filed Dec. 9, 2005, Inventors: Robert T. Moton Jr.; Mark J. Enzmann; and Samuel N. Zellner.

U.S. Appl. No. 11/298,149, entitled "System and Method for Using Location Information to Execute an Action" filed Dec. 9, 2005, Inventors: Robert T. Moton Jr.; Mark J. Enzmann; and Samuel N. Zellner.

U.S. Appl. No. 11/300,694, entitled "System and Method for Using Location Information to Execute an Action" filed Dec. 15, 2005, Inventor: Samuel N. Zellner.

U.S. Official Action dated Dec. 13, 2005 cited in U.S. Appl. No. 09/740,372.

U.S. Official Action dated Nov. 21, 2005 cited in U.S. Appl. No. 09/740,414.

U.S. Official Action dated Mar. 1, 2004 cited in U.S. Appl. No. 09/740,375.

U.S. Final Official Action dated Sep. 24, 2004 cited in U.S. Appl. No. 09/740,375.

U.S. Official Action dated Feb. 28, 2005 cited in U.S. Appl. No. 09/740,375.

U.S. Final Official Action dated Jul. 26, 2005 cited in U.S. Appl. No. 09/740,375.

Petronis, Scott, "Mapping Technology: The Common Thread," Wireless Review, vol. 17, No. 3, pp. 10-14, Feb. 1, 2000, ISSN: 1099-9248.

U.S. Official Action dated May 7, 2003 cited in U.S. Appl. No. 09/740,373.

U.S. Final Official Action dated Oct. 21, 2003 cited in U.S. Appl. No. 09/740,373.

U.S. Official Action dated Jan. 26, 2004 cited in U.S. Appl. No. 09/740,373.

U.S. Official Action dated Apr. 28, 2005 cited in U.S. Appl. No. 09/740,373.

U.S. Official Action dated Aug. 30, 2005 in U.S. Appl. 10/704,775.

U.S. Official Action dated Oct. 4, 2005 in U.S. Appl. No. 10/819,940.

U.S. Appl. No. 11/252,039, entitled "Identity Blocking Service from a Wireless Service Provider" filed Oct. 17, 2005, Inventors: Robert T. Moton Jr.; Mark J. Enzmann; and Samuel N. Zellner.

U.S. Official Action dated Jun. 7, 2005 in U.S. Appl. No. 09/630,134.

U.S. Appl. No. 09/630,134, entitled "Method and System for Delivery of a Calling Party's Location," filed Aug. 1, 2000, Inventors: Samuel N. Zellner; Mark J. Enzmann; and Robert T. Moton Jr.

U.S. Appl. No. 09/740,414, entitled "Location Blocking Service from a Wireless Service Provider," filed Dec. 19, 2000, Inventors: Samuel N. Zellner; Mark J. Enzmann; and Robert T. Moton, Jr.

U.S. Appl. No. 09/740,372, entitled "Identity Blocking Service from a Wireless Service Provider," filed Dec. 19, 2000, Inventors: Samuel N. Zellner; Mark J. Enzmann; and Robert T. Moton, Jr.

U.S. Appl. No. 09/739,162, entitled "System and Method for Surveying Wireless Device Users by Location," filed Dec. 19, 2000, Inventors: Samuel N. Zellner; Mark J. Enzmann; and Robert T. Moton Jr.

U.S. Appl. No. 09/739,340, entitled "System and Method for Using Location Information to Execute an Action," filed Dec. 19, 2000, Inventors: Samuel N. Zellner; Mark J. Enzmann; and Robert T. Moton Jr.

U.S. Appl. No. 10/704,775, entitled "Location Blocking Service for Wireless Networks," filed Nov. 12, 2003, Inventors: Samuel N. Zellner; Mark J. Enzmann; and Robert T. Moton Jr.

U.S. Appl. No. 10/819,940, entitled "Anonymous Location Service for Wireless Networks," filed Apr. 8, 2004, Inventors: Samuel N. Zellner; Mark J. Enzmann; and Robert T. Moton Jr.

U.S. Official Action dated Feb. 12, 2003 in U.S. Appl. No. 09/630,134.

U.S. Official Action dated Jul. 10, 2003 in U.S. Appl. No. 09/630,134.

U.S. Official Action dated Jun. 7, 2004 in U.S. Appl. No. 09/630,134.

U.S. Official Action dated Jan. 13, 2005 in U.S. Appl. No. 09/630,134.

U.S. Official Action dated May 16, 2003 in U.S. Appl. No. 09/740,372.

U.S. Official Action dated Oct. 30, 2003 in U.S. Appl. No. 09/740,372.

U.S. Official Action dated Apr. 15, 2004 in U.S. Appl. No. 09/740,372.

U.S. Official Action dated Nov. 2, 2004 in U.S. Appl. No. 09/740,372.

U.S. Official Action dated Mar. 12, 2004 in U.S. Appl. No. 09/739,340.

U.S. Official Action dated Dec. 10, 2004 in U.S. Appl. No. 09/739,340.

U.S. Official Action dated Nov. 10, 2003 in U.S. Appl. No. 09/739,162.

U.S. Official Action dated Mar. 9, 2004 in U.S. Appl. No. 09/739,162.

U.S. Official Action dated Sep. 9, 2004 in U.S. Appl. No. 09/739,162.

U.S. Official Action dated Nov. 10, 2003 in U.S. Appl. No. 09/740,414.

U.S. Official Action dated Apr. 21, 2004 in U.S. Appl. No. 09/740,414.

U.S. Official Action dated Oct. 5, 2004 in U.S. Appl. No. 09/740,414.

PCT International Search Report, PCT/US01/22295.

Microsoft Mobility Developer Conference 2003.

3rd Generation Partnership Project: Technical Specification Group Services and System Aspects; Functional Stage 2 Description of Location Services in UMTS (1999).

http://www.openwave.com/us/news_room/press_releases/2001/20010320, "OpenWave Announces Availability to End-to-End Set of Location Services for Wireless Internet".

"Wireless Application Protocol", Oct. 1999, Wireless Internet Today, pp. 1-20.

Mark Moeglein, et al., "An Introduction to Snap Track Server-Aided GPS Technology", available at http://www.snaptrack.com/atwork.html.

"Signal Soft Wireless Location Services", available at http://signalsoftcorp.com/products/location_manager.html.

U.S. non-final Official Action dated Dec. 15, 2006 in U.S. Appl. No. 11/522,239.

U.S. non-final Official Action dated Jan. 9, 2007 in U.S. Appl. No. 11/406,881.

U.S. final Official Action dated Jan. 11, 2007 in U.S. Appl. No. 11/322,531.

U.S. non-final Official Action dated Jan. 16, 2007 in U.S. Appl. No. 11/187,347.

U.S. final Official Action dated Feb. 6, 2007 in U.S. Appl. No. 11/252,039.

U.S. final Official Action dated Apr. 2, 2007 in U.S. Appl. No. 09/630,134.

U.S. non-final Official Action dated Apr. 6, 2007 in U.S. Appl. No. 11/298,419.

U.S. Appl. No. 11/637,369, filed Dec. 12, 2006, entitled "Surveying Wireless Device Users by Location".

U.S. Appl. No. 11/959,283, filed Dec. 18, 2007, entitled "Location-Based Security Rules".

U.S. Final Office Action dated Apr. 2, 2007 in U.S. Appl. No. 09/630,134.

U.S. Office Action dated Apr. 6, 2007 in U.S. Appl. No. 11/298,419.

U.S. Final Office Action dated Jul. 19, 2007 in U.S. Appl. No. 11/298,149.

U.S. Final Office Action dated Sep. 10, 2007 in U.S. Appl. No. 11/522,239.

U.S. Office Action dated Sep. 12, 2007 in U.S. Appl. No. 11/406,881.

U.S. Office Action dated Sep. 13, 2007 in U.S. Appl. No. 11/252,039.

U.S. Final Office Action dated Nov. 15, 2007 cited in U.S. Appl. No. 11/298,419.

U.S. Office Action dated Dec. 31, 2007 cited in U.S. Appl. No. 11/528,782.

* cited by examiner

THIRD PARTY LOCATION QUERY FOR
WIRELESS NETWORKS

CROSS-REFERENCE TO RELATED
APPLICATION

This is a continuation of application Ser. No. 09/739,315 filed Dec. 19, 2000 and issuing as U.S. Pat. No. 7,130,630.

BACKGROUND

1. Field of the Invention

The present invention relates to the field of wireless networks, and in particular, to wireless networks that track the location of wireless network devices.

2. Background of the Invention

In compliance with regulations promulgated by the Federal Communications Commission (FCC), wireless networks will soon provide services that are able to determine the location of all network users. These federally mandated services, known as enhanced wireless 911 (E911) services, will require wireless telephones to provide 911 call centers, or Public Safety Answering Points (PSAPs), with vital information necessary to locate and identify a caller in an emergency. To comply with E911 standards, wireless network providers will track the location and identity information of all wireless callers, with the purpose of providing such information to emergency personnel when a caller dials 911 from a wireless telephone. The FCC's wireless E911 rules require certain Commercial Mobile Radio Services (CMRS) carriers to begin transmission of enhanced location and identity information in two phases. Phase I requires carriers to transmit a caller's telephone number and general location to a PSAP. Phase II requires carriers to provide more precise location information to the PSAP.

Under the FCC rules, wireless networks and the corresponding wireless handheld devices, such as cellular telephones, will provide both the identity and location of the caller to a 911 dispatcher. To provide a caller's identity, the wireless handheld device will furnish a mobile identification number (MIN), indicating in most instances the telephone number of the device. The wireless network and wireless handheld devices will provide the location of callers using a network-based location system (e.g., triangulation), global positioning systems (GPSs) within the handheld devices, or a combination of the two systems.

Although, in large part, wireless network providers will implement the location tracking systems to comply with the FCC standards, once completed, the providers will have the ability to offer other location-based services supported by the E911 infrastructure. Indeed, beyond the needs of PSAPs in emergency situations, there are many instances in which it is helpful to know the location of a network user. For example, a service dispatcher monitoring the activities of his service technicians may wish to determine the exact locations of his technicians to facilitate efficient scheduling. Although, with conventional mobile telephone networks, the dispatcher could call and ask the technician for his location, the dispatcher may prefer to ascertain the location information without interrupting the technician's activities.

Other location tracking systems provide the ability to determine a person's location without communicating with (or interrupting) the person. However, these solutions require dedicated networks and network devices. For instance, although a global positioning system can provide a person's location without contacting the person, the system requires that the party requesting the location information (referred to herein as the "requestor") have communication hardware that receives the location information from the person's GPS receiver. For example, in a typical fleet vehicle tracking system, the fleet manager must purchase and maintain a central processor that communicates with the GPS receiver in each vehicle.

SUMMARY OF THE INVENTION

The present invention is a location query service for use with a wireless network that tracks the location of network devices. The service provides requestors with the locations of network users, based on the locations of the users' wireless network devices. The service enables a requestor to obtain a network user's location without requiring communication with the user. In addition, the service relieves a requestor of the burden of purchasing and maintaining dedicated location tracking equipment by taking advantage of existing communication infrastructures, such as global computer networks, Public Switched Telephone Networks (PSTNs), and wireless networks (with their soon-to-be-implemented location systems).

According to a preferred embodiment of the present invention, the location query service receives a location query from a requestor for a network user, retrieves the location information of the network user, and returns the location information to the requestor. Preferably, the requestor is an authorized requestor and the service authenticates that the requestor is authorized before returning the location information to the requestor. Within the query, the requestor provides an identification of the network user, such as a name, telephone number, Internet address, or electronic mail (email) address. The service of the present invention supports a variety of communication methods through which a requestor can submit a location query, for example, voice calls through the Public Switched Telephone Network (PSTN) to an interactive voice response unit (IVRU), personal computer access through a global computer network, and cellular telephone access through a global computer network.

In processing location queries, a preferred embodiment of the present invention gives the network user control of who can receive his location information. The network user provides the service with a list of authorized requestors who may receive the user's location information. The service authenticates that a requestor is authorized before forwarding location information.

In an alternate preferred embodiment of the present invention, the location query service prompts a network user each time an unauthorized requestor asks for location information. An unauthorized requestor is a requestor who is not designated on a network user's list of authorized requesters and who has not been pre-approved to receive the user's location information. With these "off-list" requests, the network user permits or denies access for unauthorized (off-list) requestors on an individual basis, while automatically permitting access by authorized (on-list) requestors.

In a preferred embodiment, the system of the present invention includes a user wireless network and a location server. The user wireless network is in communication with a plurality of network devices operated by a plurality of network users. The user wireless network is also in communication with a location system for determining the location of each network device. The location server is in communication with the wireless network and with a plurality of requesters. The location server accommodates a variety of interfaces in communicating with the plurality of requesters. For example, for Internet protocol (IP) communication, the location server communicates with the plurality of requestors through a global computer network, e.g., the Internet. As another example, for voice communication, the location server communicates with the plurality of requestors through a PSTN.

According to a preferred method of the present invention, the location server receives a location query for a network user from a requester, retrieves the user's location from the location system, and forwards the location back to the requestor. Preferably, the location server also confirms that the requestor is authorized to receive the user's location. In an alternate preferred embodiment, if the location system provides the location in a "raw" form, not easily understood by the typical requestor (e.g., x-y position coordinates), the method further includes translating the location from the raw form to a "displayable" form (e.g., a street address, building name, or area name). The system component that executes this translation function is a mapping converter. The mapping converter can be provisioned in several locations within the system, from the requestor's device to the devices of the plurality of requestors.

Accordingly, it is an object of the present invention to provide a requestor with the location of a wireless network user.

Another object of the present invention is to provide a wireless network user with the ability to automatically furnish specified requestors with the location of the network user.

Another object of the present invention is to provide a wireless network user with the ability to approve or deny access to the user's location information by a requestor who has not been pre-approved.

These and other objects of the present invention are described in greater detail in the detailed description of the invention, the appended drawings, and the attached claims.

DETAILED DESCRIPTION OF THE INVENTION

The present invention is a location query service for use with a wireless network that tracks the locations of network users. The location query service provides a requestor with the location of a network user. In providing this service, the present invention contemplates future enhanced digital cellular networks, in which network users will use digital cellular handheld devices to access data from a global computer network, and in which digital cellular network providers will track the location of each network user.

Figure 1:
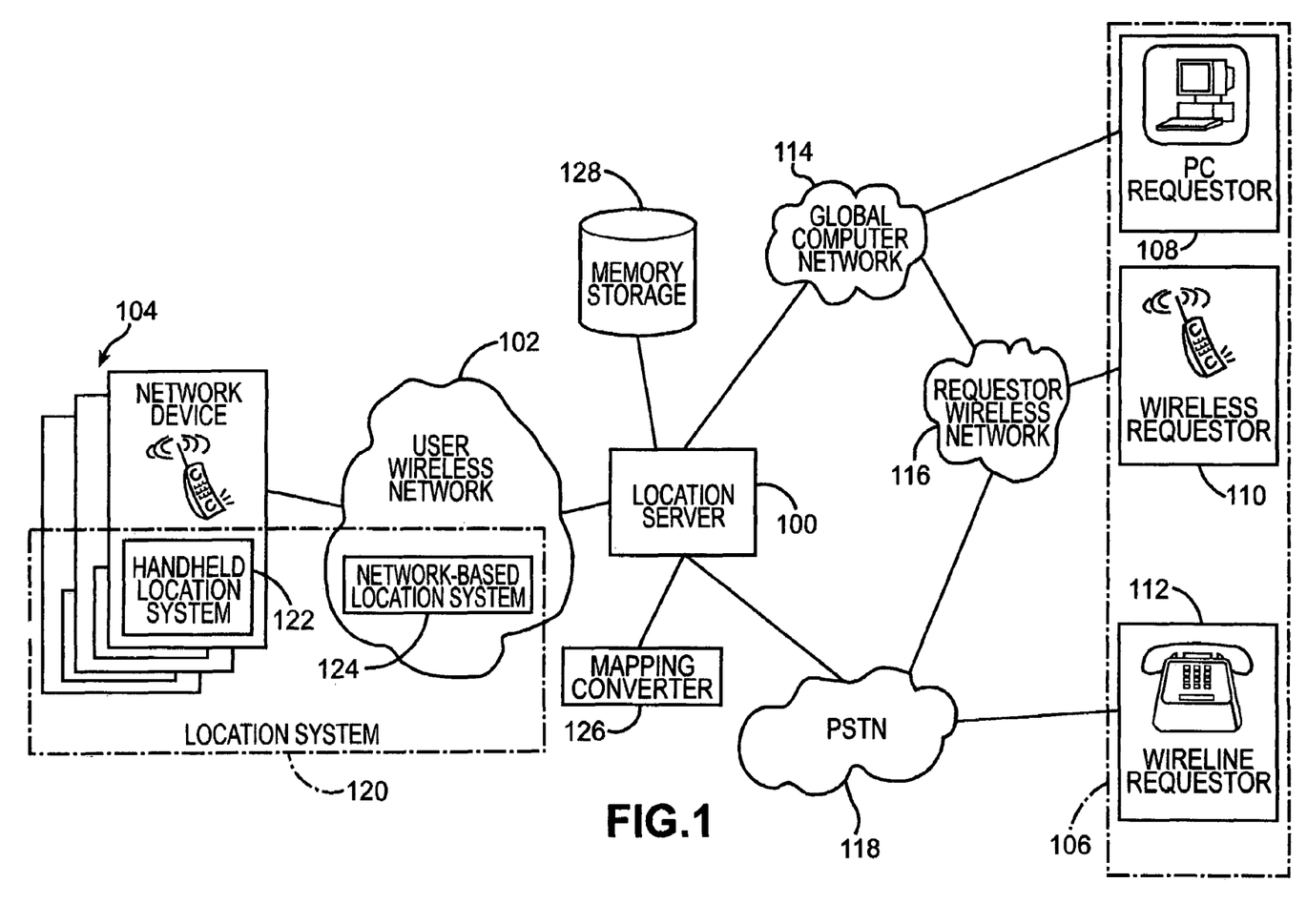
FIG. 1 is a schematic diagram of a system architecture that provides the location query service according to a preferred embodiment of the present invention.

Referring to FIG. 1, the primary components of a preferred embodiment of the present invention include a location server 100 and a user wireless network 102. User wireless network 102 is in communication with a plurality of network devices 104. Location server 100 is in communication with user wireless network 102 and with a plurality of requestors 106. The plurality of requestors 106 employ any suitable means to communicate with location server 100, but preferably use at least one of a PC requestor 108, a wireless requestor 110, and a wireline requestor 112. For communication between location server 100 and PC requestor 108, the present invention includes a global computer network 114. For communication between location server 100 and wireless requestor 110 (which has IP messaging capabilities), the present invention includes a requestor wireless network 116 and global computer network 114 for IP messaging, and requestor wireless network 116 and a PSTN 118 for voice communication. For communication between location server 100 and wireline requestor 112, the present invention includes PSTN 118.

According to a preferred embodiment of the present invention, user wireless network 102 is in communication with a location system 120 that provides the locations of the plurality of network devices 104. Location system 120 includes one or both of handheld location systems 122 and a network-based location system 124. Handheld location systems 122 are provisioned in wireless handheld devices 104. Network-based location systems 124 are part of user wireless network 102.

Location system 120 provides the location information, e.g., position coordinates, of a handheld device, which indicates where a network user is located. Location system 120 can be a part of the wireless network or can be contained in the handheld devices. In the preferred embodiment of the present invention, as shown in FIG. 1, location system 120 is both a part of the wireless network and is also contained in the handheld devices. For example, suitable methods of determining location as a part of the wireless network include Wireless Access Protocol (WAP) location services, Time Difference of Arrival (TDOA) location systems, Angle of Arrival (AOA) location systems, and other systems using triangulation across cell sites or cell sectors. An example of a suitable location system in the handheld devices is a GPS.

If location system 120 provides location information in raw form, a further preferred embodiment of the present invention includes a mapping converter 126. An example of information in raw form would be GPS coordinates, with which the typical telephone user is unfamiliar. As used herein, "raw" refers to location information in a rudimentary form, such that a typical telephone user would find it difficult to understand. "Displayable" refers to location information easily understood by a typical network user. Although displayable may imply a visual communication, as used herein, the term extends to other forms of communication, such as audio-based communication. Mapping converter 126 includes a cross-referenced database that allows mapping converter 126 to translate raw location information into displayable location information. For example, the database of mapping converter 126 could include an entry associating coordinates "R-S" (raw information) with the description "101 Park Place" (displayable information).

Although shown as a separate component of the system in FIG. 1, mapping converter 126 could be integral to a component described above. One of ordinary skill in the art would understand that the functions and structure of mapping converter 126 could be located in several different places, anywhere from location system 120 to the communication devices of the requestors 106. For example, mapping converter 126 could be located within network-based location system 124. As another example, mapping converter 126 could also be located within location server 100. Regardless of where mapping converter 126 is provisioned, the desired end result is to deliver displayable location information to the plurality of requestors 106.

Location server 100 executes the service logic of the present invention, including receiving location queries from requestors 106, confirming the access levels of requestors 106, obtaining the location information of wireless network devices 104, and returning the location information to requestors 106. Although shown as a separate component in FIG. 1, one of ordinary skill in the art would appreciate that location server 100 could be a part of another system component, such as user wireless network 102, PSTN 118, or global computer network 114.

In a representative embodiment, location server 100 consists of two components. The first component is a locating mechanism (such as location system 120) that determines locations of network devices 104 using various technologies (e.g., GPS, triangulation, radio signal delay, and cell sector) and combinations thereof. The location mechanism can reside in a network device (e.g., GPS) or within user wireless network 102. The location mechanism produces x-y coordinates that are typically transmitted to the second component of location server 100, which could be in the same box or could be connected via an IP network. The second component of location server 100 integrates the coordinate information into various mapping systems and provides an interface to other applications through various protocols, of which IP is the most common.

In a preferred embodiment of the present invention, location server 100 is in communication with a memory storage 128. Memory storage 128 is a database or other memory storage device that can record relationships between device identifications (e.g., MINs) and network user identifications. In addition, memory storage contains authorized requestor lists for each device identification. Although FIG. 1 shows memory storage 128 as a separate component of the system accessible to location server 100, memory storage 128 could be contained within location server 100.

Wireless handheld devices 104 operate over user wireless network 102. Familiar examples include pagers and cellular telephones. As a minimum, wireless handheld devices 104 provide network users with wireless communication and cooperate with user wireless network 102 to provide the location of the device. This cooperation may simply involve wireless transmissions to user wireless network 102 that enable network-based location system 124 to ascertain the locations of devices 104. Or, in conjunction with network-based location system 124, wireless handheld devices 104 may include handheld location systems 122, such as GPSs integral to the devices. To facilitate the alternate preferred embodiment in which a network user responds to off-list requests, wireless handheld devices 104 include messaging capabilities that can communicate a request for access, the identification of the unauthorized requester, and a response by the network user. For example, such messaging capabilities can be audio-based, text-based, or graphical. Preferably, wireless handheld devices 104 are WAP-compatible thin clients having thin browsers adapted to access global computer network 114 and to communicate with location server 100.

Global computer network 114 provides communication between TCP/IP requestor devices and location server 100. Preferably, global computer network 114 is the Internet. Also, preferably, network 114 provides a user-friendly interface, e.g., a graphical user interface, through which a requestor can submit a location query. With a graphical user interface (GUI), the requester device, such as PC requestor 108, is provisioned with software that cooperates with the GUI. Global computer network 114 also preferably supports communication with WAP-compatible wireless devices, such as wireless requestor 110. With these WAP-compatible wireless devices, requestor wireless network 116 provides communication between wireless requestor 110 and global computer network 114.

PSTN 118 provides communication between PSTN devices and location server 100. Along with requestor wireless network 116, PSTN 118 also provides communication between wireless requestors and location server 100. Location server 100 preferably supports a number of different protocols, at least one of which is IP. PSTN 118 preferably includes a Voice XML (Extensible Markup Language) server, which allows PSTN 118 to interface with location server 100 and provides a common markup language for supporting voice browsing applications. The Voice XML server could include, for example, an IVRU allowing a requestor to use a touch-tone pad to navigate the application.

The plurality of requestors 106 communicate with location server 100 using a device compatible with location server 100 or compatible with an interface between the requestors 106 and location server 100. Global computer network 114 and PSTN 118 are examples of these types of interfaces. Compatible devices include personal computers and IP wireless devices for global computer network 114, and standard wireline telephones for PSTN 118.

Figure 2:
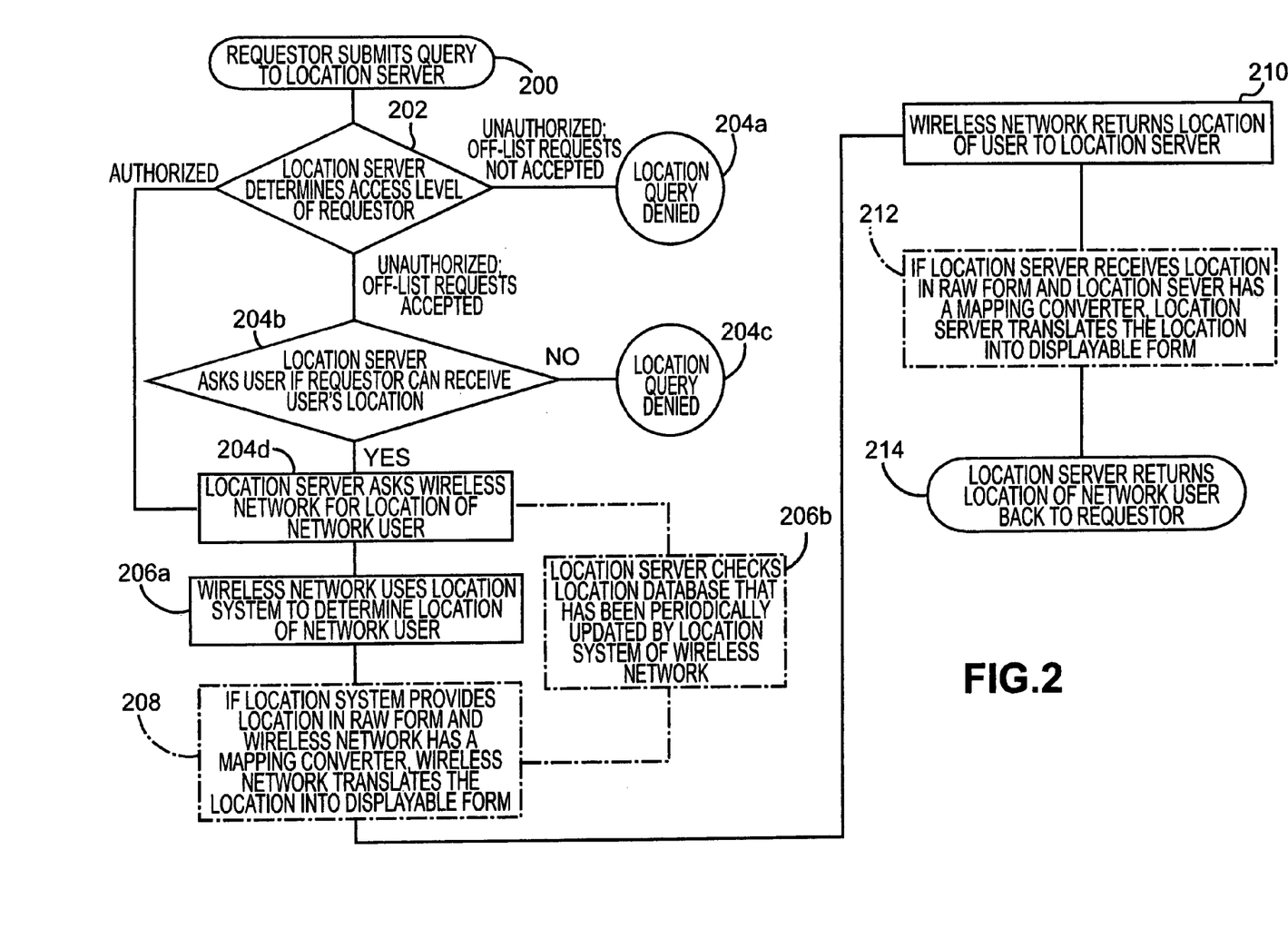
FIG. 2 is a flow chart tracing the steps for providing a location query service according to a preferred embodiment of the present invention.

Together, the above components provide the location query service as outlined in the flowchart of FIG. 2, according to a preferred embodiment of the present invention. While the system operation described herein and illustrated in the diagram and flowchart contains many specific details, these specific details should not be construed as limitations on the scope of the invention, but rather as examples of preferred embodiments thereof. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

As shown in step 200, a requestor submits a location query to location server 100. The query includes at least an identification of the requestor and an identification of the network user about whom the requestor desires location information. Optionally, the query also includes a password, which enables a location query service provider to allow access to the service only by requesters who pay for the service. Alternately, only the network user pays for the service and gives her authorized requestors a password to gain access to the service.

The requestor submits the query using any number of communications media supported by location server 100 and the requestor's individual communication device. For example, if the requestor uses a personal computer 108 linked to location server 100 through global computer network 114, the requester could initiate the query using a graphical user interface. As another example, if the requestor uses a text messaging wireless device 110 linked to location server 100 through requestor wireless network 116 and global computer network 114, the requestor could initiate the query using a menu driven interface or a series of key sequence inputs. As another example, if the requestor uses a wireline telephone, the requestor could interact with an IVRU using the requestor's touch-tone keys to initiate the query.

In the preferred embodiment, the present invention accommodates the variety of ways in which a requestor can identify the network user that the requestor wishes to locate. For example, the requestor can give a telephone number, name, Internet address, or email address of the network user. In response, location server 100, global computer network 114, PSTN 118, or a separate system component consults a database cross referencing this information and translates the given identification into an identification of the network user's wireless device (e.g., the MIN). As described later in this process, location server 100 provides location system 120 with this device identification to search for the location of the device.

Once location server 100 has received the query, in step 202, location server 100 determines whether the requestor is an authorized requestor and whether the network user in question accepts requests from unauthorized off-list requestors to view the network user's location information. Location server 100 determines if the requestor is an authorized requestor by consulting memory storage 128, which contains a list that the network user provides. The list indicates which people (requesters) have access to the network user's location information. Although shown as a separate system component in FIG. 1, memory storage 128 could be a part of location server 100, such that the list is stored in location server 100.

Along with the access list, the network user specifies a user preference dictating whether the network user will entertain requests to release her location information to requestors not on the access list. The user preference is also preferably stored in memory storage 128, but can be stored in any location accessible to location server 100. Location server 100 consults this user preference if the requestor is not on the access list.

If the requestor is unauthorized and the network user does not accept individual requests to release location information, in step 204a, location server 100 returns a message to the requestor reporting that the location query has been denied.

If the requestor is unauthorized, but the network user does entertain requests to release location information, in step 204b, location server 100 asks the network user if the requestor can receive the network user's location information. In asking for approval, location server 100 provides the network user with the identity of the requester. If the network user chooses not to release her location information to the requester, in step 204c, location server 100 returns a message to the requester reporting that the location query has been denied.

If, in step 204b, the network user chooses to release her location information to the requestor, in step 204d, location server 100 proceeds with determining the location information of the wireless device. Likewise, if originally in step 202, location server determines that the requestor is on the access list and is authorized, location server 100 proceeds with determining the location information of the wireless device in step 204d.

In step 204d, location server 100 asks user wireless network 102 for the location information of the network user. In this inquiry, location server 100 includes the identification of the device corresponding to the network user.

In step 206a, user wireless network 102 uses location system 120 to determine the location of the specified network device. User wireless network 102 monitors wireless handheld devices that are powered on. In most instances, a network user simply turns on his wireless handheld device and, if it is a text messaging device, leaves the network interface open, perhaps to a web page. The initial accessing of the web page or the completion of any other wireless transmission (e.g., placing of a wireless telephone call) provides user wireless network 102 with location and identity information. In addition, each time the web page automatically refreshes, or each time the network user enters a browse command, user wireless network 102 receives updated location information. Thus, after location server 100 asks user wireless network 102 for the location of the network user, location system 120 of user wireless network 102 waits for the next transmission by the network device and determines the location information from that transmission. Alternately, instead of having location server 100 query user wireless network 102 for location information regarding a specific mobile device, location system 120 could be configured to continuously track devices and push location information to location server 100.

Figure 3:
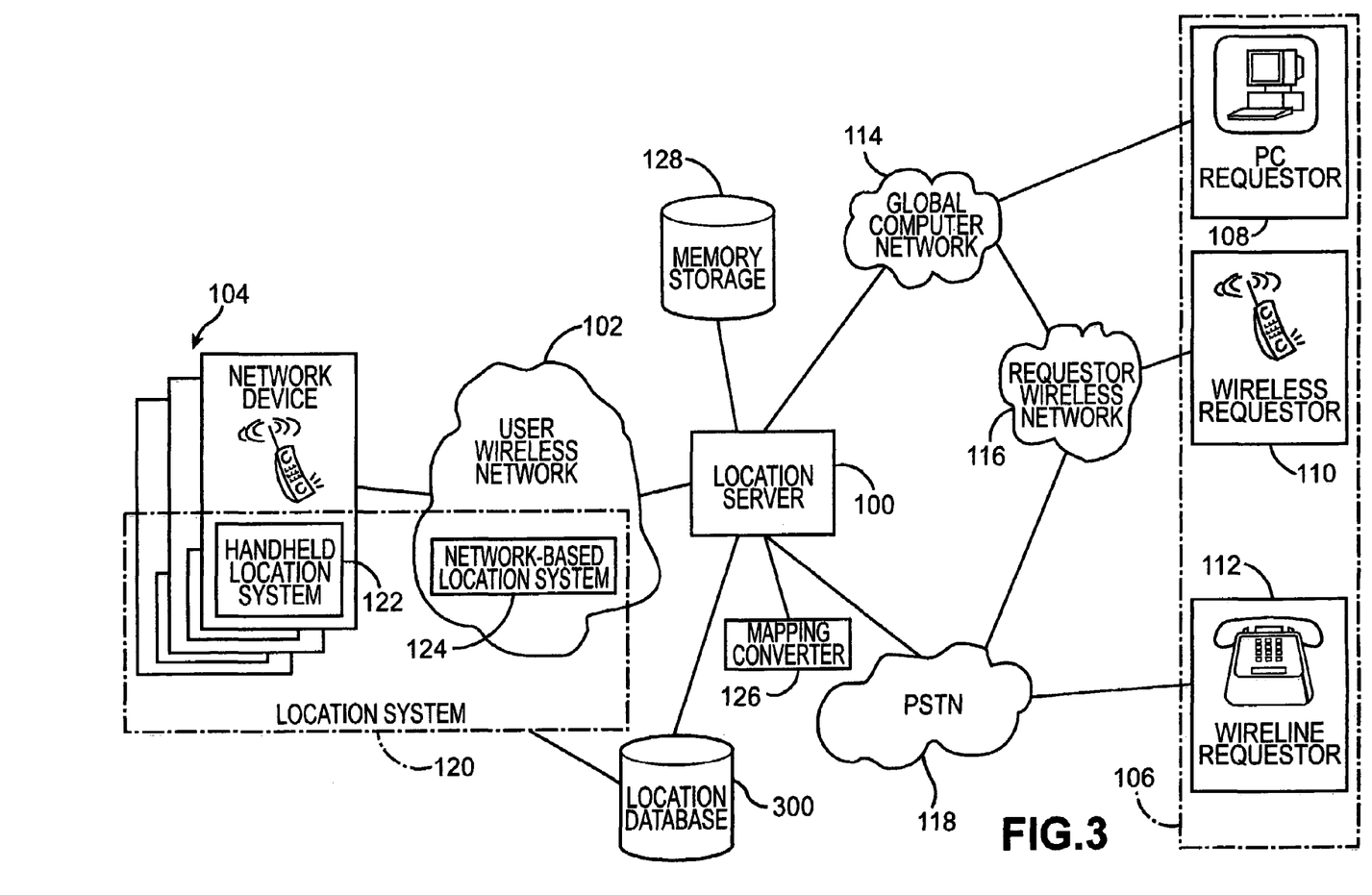
FIG. 3 is a schematic diagram of a system architecture that provides the location query service according to an alternate preferred embodiment, in which a device's location is periodically recorded in a location database 300.

As another way to avoid a prolonged wait for the transmission providing the location information, in an alternate preferred embodiment, as shown in FIG. 3, the present invention periodically records a device's location in a location database 300. Therefore, instead of activating location system 120 only in response to a request from location server 100, location system 120 of user wireless network 102 periodically updates location database 300 and always has location information available when location server 100 makes a request. In such a case, as shown in step 206b, location server 100 checks location database 300 for the location information of the network user. Although maintaining a database that is periodically updated for all network devices requires considerable amounts of data storage, this alternate embodiment provides a more immediate response to the requestor.

Figure 4:
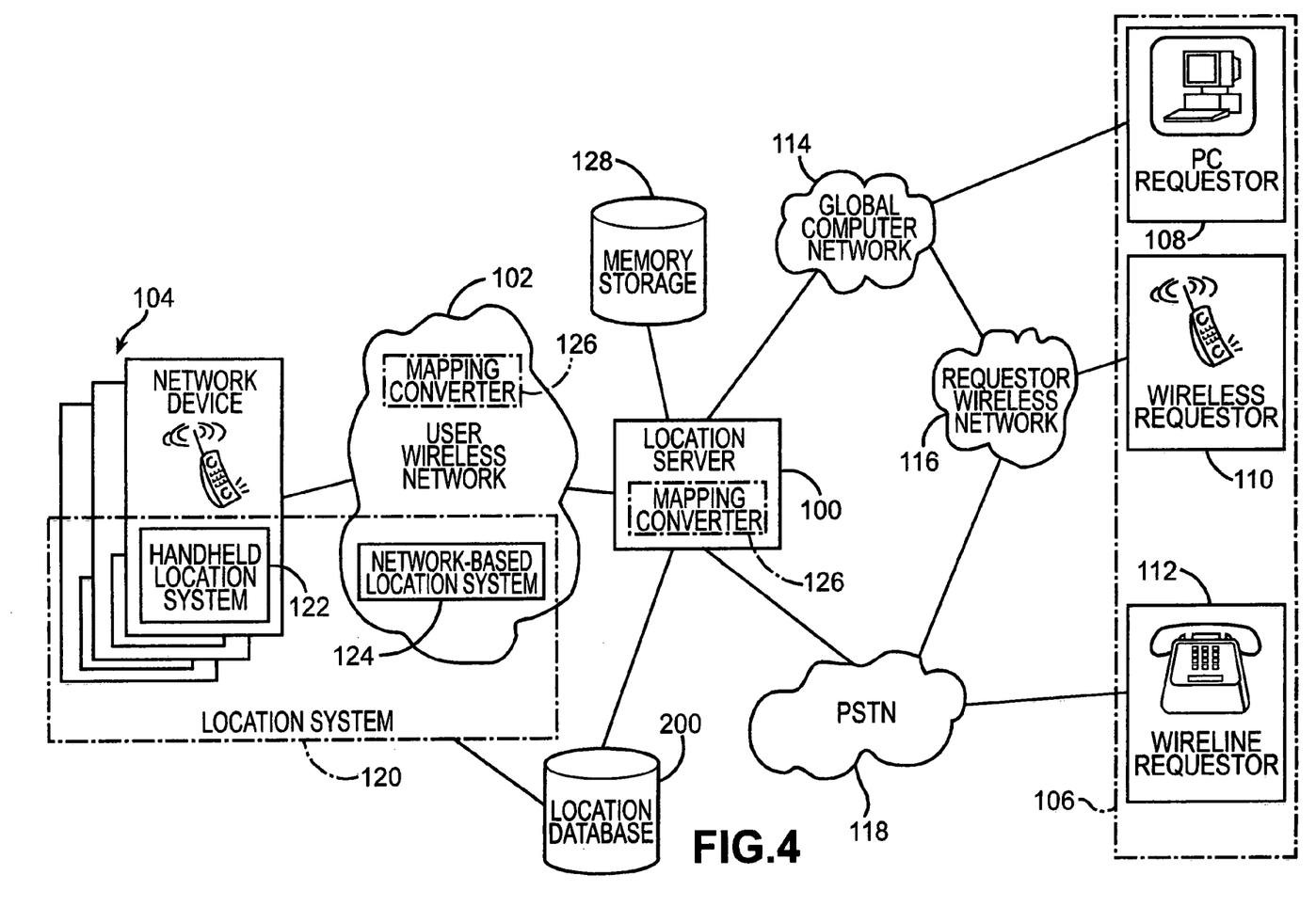
FIG. 4 is a schematic diagram of a system architecture that provides the location query service according to an alternate preferred embodiment of the present invention, with the mapping converter provisioned in alternate locations.

In steps 206a or 206b, location system 120 of user wireless network 102 provides the location information in either raw or displayable forms. If location system 120 provides raw location information, such as x-y coordinates, the method of the present invention preferably further includes translating the raw data to a displayable message, easily comprehended by a typical requester. Mapping converter 126 executes this translation and the method of the present invention varies depending upon where mapping converter 126 is provisioned (as described below and shown in FIG. 4).

In step 208, if location system 120 provides raw location information and mapping converter 126 is provisioned in user wireless network 102, user wireless network 102 translates the raw location information to a displayable form before returning the location information to location server 100. If location system 120 provides the location information in displayable form, or if location system 120 provides the location information in raw form and user wireless network 102 does not have a mapping converter, user wireless network 102 simply forwards the location information.

In step 210, user wireless network 102 returns the location information, whether raw or displayable, to location server 100. In step 212, if the location information is in raw form and location server 100 contains mapping converter 126, location server 100 translates the location information to displayable form. Finally, in step 214, location server 100 returns the location information of the network user back to the requester.

SPECIFIC EXAMPLES OF PREFERRED EMBODIMENTS

The benefits of the present invention apply to numerous situations in which a requestor wants to know the location of a network user. The most applicable situations involve network users that require a certain degree of supervision by another (the requester). Examples of these types of network users include parolees, the elderly, and children. In each case, the present invention provides a location query service by making use of a wireless device that the network user would otherwise already be using for its primary purpose, e.g., a cellular telephone used for personal voice communication.

As another specific example, the present invention could be implemented in the context of an instant messaging service. A user could have an instant messaging service configured to display only the friends of that user who are in the same city as the user. When a friend's name appears on the user's instant messaging screen, the user may want the option to query for the location of the friend to determine, for example, whether the friend is near enough to have lunch and, if so, to select a restaurant that is conveniently located for the friend and the user. Using the present invention to obtain the location information would save the user from having to send a message to the friend asking for the location of the friend. The location query of the present invention could be explicit or implicit, occurring in the background of the instant messaging service, as a result of a configuration option or an action in the application.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for providing a location query service for use with a wireless network that tracks locations of network users, the method comprising:
    receiving from a requester a query through an audio interface asking for location information associated with a wireless network user;
    determining whether the requester is authorized to receive the requested location information and, if so, retrieving the location information associated with the wireless network user and providing the location information to the requester;
    if the requester is unauthorized, forwarding to the wireless network user the requester identification and the request for the requester to receive the location information from the audio interface;
    if the wireless network user chooses not to release the requested location information to the unauthorized requester, returning a message to the requester that the request is denied; and
    if the wireless network user chooses to release the requested location information to the unauthorized requester, retrieving the location information and forwarding the location information to the requester.

2. The method of claim 1 wherein the location information is forwarded to the requester through the audio interface.

3. The method of claim 1 farther comprising accessing the location query service through a messaging interface.

4. The method of claim 3, wherein the messaging interface comprises an SMS interface.

5. A method of providing an instant messaging service incorporating location information of instant-messaging users, comprising:
    receiving from an instant-messaging user a query asking for location information of at least one instant messaging member identified by the user;
    accessing an instant messaging database for location information of the at least one identified member;
    obtaining from the database location information for at least one such identified member only if the identified instant-messaging user is authorized to receive the location information;
    transmitting the obtained location information of the at least one identified member to the instant-messaging user; and
    wherein the at least one such identified member is on a list of friends provided by the instant-messaging user.

6. The method of claim 5, wherein only the location information of the at least one identified member within a certain geographic area is transmitted to the instant-messaging user.

7. The method of claim 6, wherein the certain geographic area is received from the instant-messaging user.

8. The method of claim 6, wherein the certain geographic area is defined to have a certain relation to a known geographic location of the instant-messaging user, so that no location information of an identified member whose obtained location is outside the certain geographic area is transmitted to the instant-messaging user.

9. A method of providing an instant messaging service incorporating location information of instant-messaging users, comprising:
    receiving from an instant-messaging user a query asking for location information of at least one instant messaging member identified by the user;
    accessing an instant messaging database for location information of the at least one identified member;
    obtaining from the database location information for at least one such identified member only if the identified instant-messaging user is authorized to receive the location information;
    transmitting the obtained location information of the at least one identified member to the instant-messaging user; and
    wherein the location information of the at least one identified member is transmitted to the instant-messaging user only if the at least one identified member and the instant-messaging user each are within a certain proximity to a predetermined destination location received from the instant-messaging user.

10. The method of claim 9, wherein the destination location is transmitted to the instant-messaging user for display on an instant-messaging device of the instant-messaging user.

11. A system for providing an instant-messaging service incorporating location of a network of instant-messaging users, comprising:
    a location sewer in communication with the network of instant-messaging users and operative to:
    receive from an instant-messaging user a query asking for location information of at least one instant-messaging member identified by the user;
    receive from a location system in communication with the network of instant-messaging users the location information of at least one instant-messaging member identified by the user, wherein the user is authorized to receive the location information;
    transmit the location information of the at least one such identified member to the instant-messaging user; and
    wherein the location sewer transmits the location information of the at least one identified member to the instant-messaging user only if the instant-messaging user and the at least one identified member are within a certain proximity to a predetermined destination received from the instant-messaging user.

* * * * *

UNITED STATES PATENT AND TRADEMARK OFFICE
CERTIFICATE OF CORRECTION

| | | |
|---|---|---|
| PATENT NO. | : 7,636,575 B2 | |
| APPLICATION NO. | : 11/589688 | |
| DATED | : December 22, 2009 | |
| INVENTOR(S) | : Mark J. Enzmann, Robert T. Moton, Jr. and Samuel N. Zellner | |

It is certified that error appears in the above-identified patent and that said Letters Patent is hereby corrected as shown below:

Column 10 line 46 replace the word "sewer" with the word "server".

Should read,

11. A system for providing an instant-messaging service incorporating location of a network of instant-messaging users, comprising: a location "sewer" --server-- in communication with the network of instant-messaging users and operative to: receive from an instant-messaging user a query asking for location information of at least one instant-messaging member identified by the user; receive from a location system in communication with the network of instant-messaging users the location information of at least one instant-messaging member identified by the user, wherein the user is authorized to receive the location information; transmit the location information of the at least one such identified member to the instant-messaging user; and wherein the location sewer transmits the location information of the at least one identified member to the instant-messaging user only if the instant-messaging user and the at least one identified member are within a certain proximity to a predetermined destination received from the instant-messaging user.

Signed and Sealed this
Twenty-fifth Day of January, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,636,575 B2 | |
| APPLICATION NO. | : 11/589688 | |
| DATED | : December 22, 2009 | |
| INVENTOR(S) | : Mark J. Enzmann, Robert T. Moton, Jr. and Samuel N. Zellner | |

It is certified that error appears in the above-identified patent and that said Letters Patent is hereby corrected as shown below:

Column 10 line 59 replace the word 'sewer' with the word 'server'.

Signed and Sealed this
Eleventh Day of October, 2011

David J. Kappos
*Director of the United States Patent and Trademark Office*